United States Patent
Cho et al.

(10) Patent No.: US 12,015,883 B2
(45) Date of Patent: Jun. 18, 2024

(54) METHOD AND APPARATUS WITH COLOR CONVERSION

(71) Applicant: SAMSUNG ELECTRONICS CO., LTD., Suwon-si (KR)

(72) Inventors: Yang Ho Cho, Seongnam-si (KR); Geonwoo Kim, Suwon-si (KR); Sung Kwang Cho, Seoul (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 17/826,906

(22) Filed: May 27, 2022

(65) Prior Publication Data

US 2023/0156168 A1    May 18, 2023

(30) Foreign Application Priority Data

Nov. 18, 2021   (KR) .................. 10-2021-0159217

(51) Int. Cl.
| | | |
|---|---|---|
| H04N 23/84 | (2023.01) | |
| H04N 9/67 | (2023.01) | |
| H04N 9/79 | (2006.01) | |
| H04N 23/88 | (2023.01) | |

(52) U.S. Cl.
CPC ............ *H04N 9/67* (2013.01); *H04N 9/7908* (2013.01); *H04N 23/84* (2023.01); *H04N 23/88* (2023.01)

(58) Field of Classification Search
CPC ......... H04N 23/84; H04N 23/85; G06T 5/002
USPC .......................................................... 348/241
See application file for complete search history.

(56) References Cited

U.S. PATENT DOCUMENTS

| | | | |
|---|---|---|---|
| 2003/0030648 A1* | 2/2003 | Baer ................. | H04N 9/646 345/589 |
| 2007/0216951 A1* | 9/2007 | Shiraishi .......... | H04N 9/646 358/3.04 |
| 2007/0263098 A1* | 11/2007 | Quan ................ | H04N 9/67 348/222.1 |
| 2016/0255290 A1* | 9/2016 | Wajs ................. | H04N 25/60 348/164 |
| 2018/0097992 A1* | 4/2018 | Douady-Pleven .. | H04N 23/80 |
| 2018/0124283 A1* | 5/2018 | Kokemohr .......... | G06T 11/001 |

FOREIGN PATENT DOCUMENTS

| | | |
|---|---|---|
| JP | WO2014/013792 A1 | 1/2014 |
| JP | 2019-20311 A | 2/2019 |
| JP | 6601632 B2 | 11/2019 |
| JP | 2020-120204 A | 8/2020 |
| JP | 6758859 B2 | 9/2020 |
| KR | 10-2023-0037953 A | 3/2023 |

* cited by examiner

*Primary Examiner* — Anthony J Daniels
(74) *Attorney, Agent, or Firm* — NSIP Law

(57) ABSTRACT

An electronic device includes an image sensor including a color filter having a plurality of color channels, a memory storing a plurality of color conversion matrices and instructions, and a processor. The processor is configured to obtain noise information of a color image captured by the image sensor, select a target matrix from among the plurality of the color conversion matrices based on the obtained noise information, and generate a color converted image by applying the selected target matrix to the color image.

25 Claims, 12 Drawing Sheets

METHOD AND APPARATUS WITH COLOR CONVERSION

CROSS-REFERENCE TO RELATED APPLICATIONS

This application claims the benefit under 35 USC § 119(a) of Korean Patent Application No. 10-2021-0159217, filed on Nov. 18, 2021, in the Korean Intellectual Property Office, the entire disclosure of which is incorporated herein by reference for all purposes.

BACKGROUND

1. Field

The following description relates to a method and apparatus with a color conversion.

2. Description of Related Art

An image sensor included in a camera may obtain different raw color values even for the same object because the filter spectrum of the image sensor varies. However, when an image of the same object is captured, it may be desirable to obtain an example of the same color value, and thus the raw color values sensed by the image sensor may be desired to be converted into standard color values. A color conversion relationship may be modeled into a mapping relationship between a raw color value sensed by the image sensor and the standard color value. Alternatively, the color conversion relationship may be modeled through mapping based on a global relationship for the entire color or mapping, as a non-limiting example, based on a local relationship for each color region (which may be divided by brightness, hue, and saturation, for example). Generally, mapping may be classified into a linear mapping and a nonlinear mapping. For example, when the color conversion relationship is modeled based on a nonlinear polynomial function, it may be modeled into a global/nonlinear mapping relationship. When the color conversion relationship is modeled based on a look-up table, it may be modeled into a local/nonlinear mapping relationship. The modeling based on the local/nonlinear mapping relationship may increase the accuracy in mapping, although it increases the amount of computation used for mapping. Generally, a matrix in which the color conversion relationship is modeled into the global/linear relationship may be used for a camera. For example, when there are three color channels for a color sensed by a sensor filter and there are also three color channels for a standard color, a global/linear mapping relationship may be represented by a 3×3 matrix.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes an image sensor including a color filter having a plurality of color channels, a memory storing a plurality of color conversion matrices and instructions, and a processor. The processor is configured to obtain noise information of a color image captured by the image sensor, select a target matrix from among the plurality of the color conversion matrices based on the obtained noise information, and generate a color converted image by applying the selected target matrix to the color image.

A total number of the plurality of the color channels may be four or more.

The memory may store a first color conversion matrix, as a color conversion matrix of at least one of plural candidate color conversion matrices, having a minimum color conversion color difference, and store a second color conversion matrix, as another color conversion matrix among the plural candidate color conversion matrices, having a minimum noise amplification factor.

For the generation of the color converted image, the processor may be further configured to in response to a noise scale of the color image being determined to be less than a threshold noise scale, apply the first color conversion matrix to the color image to generate the color converted image, and in response to the noise scale of the color image being determined to be greater than or equal to the threshold noise scale, apply the second color conversion matrix to the color image to generate the color converted image.

For the generation of the color converted image, the processor may be further configured to in response to an exposure time corresponding to the color image being determined to be greater than a threshold exposure time, apply the first color conversion matrix to the color image to generate the color converted image, and in response to the exposure time corresponding to the color image being determined to be less than or equal to the threshold exposure time, apply the second color conversion matrix to the color image to generate the color converted image.

For the generation of the color converted image, the processor may be further configured to in response to a focal number (f-number) of a camera comprising the image sensor being less than a threshold f-number, apply the first color conversion matrix to the color image to generate the color converted image, and in response to the f-number of the camera being greater than or equal to the threshold f-number, apply the second color conversion matrix to the color image to generate the color converted image.

For the generation of the color converted image, the processor may be further configured to in response to an International Organization for Standardization (ISO) value of a camera comprising the image sensor being less than a threshold ISO value, apply the first color conversion matrix to the color image to generate the color converted image, and in response to the ISO value of the camera being greater than or equal to the threshold ISO value, apply the second color conversion matrix to the color image to generate the color converted image.

For the generation of the color converted image, the processor may be further configured to in response to a white balance gain value applied to the color image being less than a threshold white balance gain value, apply the first color conversion matrix to the color image to generate the color converted image, and in response to the white balance gain value applied to the color image being greater than and equal to the threshold white balance gain value, apply the second color conversion matrix to the color image to generate the color converted image.

The processor may be further configured to select one or more color channel combinations by selecting respective portions of color channels from the plurality of color channels, generate a candidate color conversion matrix for each of the color channel combinations, and model one candidate color conversion matrix, of the plural candidate color conversion matrices, corresponding to one of the color channel combinations, to minimize a difference between a matrix calculated by multiplying a matrix comprising raw color values of reference pixels corresponding to color channels comprised in the one of the color channel combinations by a candidate color conversion matrix corresponding to the one of the color channel combinations and a matrix comprising standard color values of the reference pixels.

The processor may be further configured to calculate respective color conversion color differences and noise amplification factors for plural candidate color conversion matrices of the plurality of color conversion matrices generated from at least plural color channels among the plurality of the color channels.

The processor may be further configured to generate raw color values of reference pixels by demosaicing raw data obtained from the image sensor, calculate converted color values of the reference pixels by applying a candidate color conversion matrix, among the plurality of candidate color conversion matrices, to the raw color values of the reference pixels, and calculate a color conversion color difference of the candidate color conversion matrix based on a difference between the converted color values calculated for the reference pixels and standard color values of the reference pixels.

The processor may be further configured to perform a singular value decomposition (SVD) on each of at least the plural candidate color conversion matrices, among the plural candidate color conversion matrices, and respectively extract a diagonal matrix of the plural candidate color conversion matrices, and calculate respective noise amplification factors of the at least plural candidate color conversion matrices based on corresponding singular values in the respective extracted diagonal matrices of the at least plural candidate color conversion.

For the calculating of the respective noise amplification factors, the processor may be further configured to calculate a noise amplification factor, among the respective noise amplification factors, based on a ratio of a minimum element value to a maximum element value among element values comprised in a corresponding extracted diagonal matrix among the respectively extracted diagonal matrices, and store the noise amplification factor in the memory.

In another general aspect, a processing-implemented method performed by the electronic device, the method comprising generating noise information, by a processor component of the electronic device, of a color image captured by an image sensor, as another component of the electronic device, comprising a color filter comprising a plurality of color channels, and selecting a target matrix from among a plurality of color conversion matrices based on the obtained noise information, and performing a color conversion of the color image by applying the selected target matrix to the color image.

The generating of the noise information may include generating the noise information of the color image captured by the image sensor dependent on the color filter comprising four or more color channels.

The method may further include storing a first color conversion matrix, as a color conversion matrix of at least one of plural candidate color conversion matrices, having a minimum color conversion color difference, and storing a second color conversion matrix, as another color conversion matrix among the plural candidate color conversion matrices, having a minimum noise amplification factor.

The performing of the color conversion may include in response to a noise scale of the color image being less than a threshold noise scale, applying the first color conversion matrix to the color image, and in response to the noise scale of the color image being greater than or equal to the threshold noise scale, applying the second color conversion matrix to the color image.

The performing of the color conversion may include in response to an exposure time corresponding to the color image being greater than a threshold exposure time, applying the first color conversion matrix to the color image, and in response to the exposure time corresponding to the color image being less than or equal to the threshold exposure time, applying the second color conversion matrix to the color image.

The performing of the color conversion may include in response to a focal number (f-number) of a camera comprising the image sensor being less than a threshold f-number, applying the first color conversion matrix to the color image, and in response to the f-number of the camera being greater than or equal to the threshold f-number, applying the second color conversion matrix to the color image.

The performing the color conversion may include applying the first color conversion matrix to the color image in response to an International Organization for Standardization (ISO) value of a camera comprising the image sensor being less than a threshold ISO value, and applying the second color conversion matrix to the color image in response to the ISO value of the camera being greater than or equal to the threshold ISO value.

The performing of the color conversion may include in response to a white balance gain value applied to the color image being less than a threshold white balance gain value, applying the first color conversion matrix to the image, and in response to the white balance gain value applied to the color image being greater than and equal to the threshold white balance gain value, applying the second color conversion matrix to the image.

The plurality of color conversion matrices may be stored in a memory of the electronic device.

A non-transitory computer-readable storage medium may store instructions that, when executed by a processor, configure the processor to perform the method above.

In another general aspect, an electronic device includes an image sensor comprising a color filter having a plurality of color channels, and a processor. The processor is configured to obtain noise information of a color image captured by the image sensor, differently select a target matrix, from among a plurality of color conversion matrices, dependent on whether the obtained noise information meets a threshold to generate a color converted image, and generate the color converted image by applying the selected target matrix to the color image.

The electronic device may further include memories configured to store the plurality of color conversion matrices and instructions, wherein the processor is further configured to execute the instructions to configure the processor to obtain the noise information of the color image captured by the image sensor or a camera including the image sensor.

The noise information may include any one or any combination of any two or more of a noise scale in the color image, an exposure time corresponding to the color image, a focal number (f-number) of a camera including the image sensor, an International Organization for Standardization (ISO) value of the camera, and a white balance gain value applied to the color data used to generate the color image.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
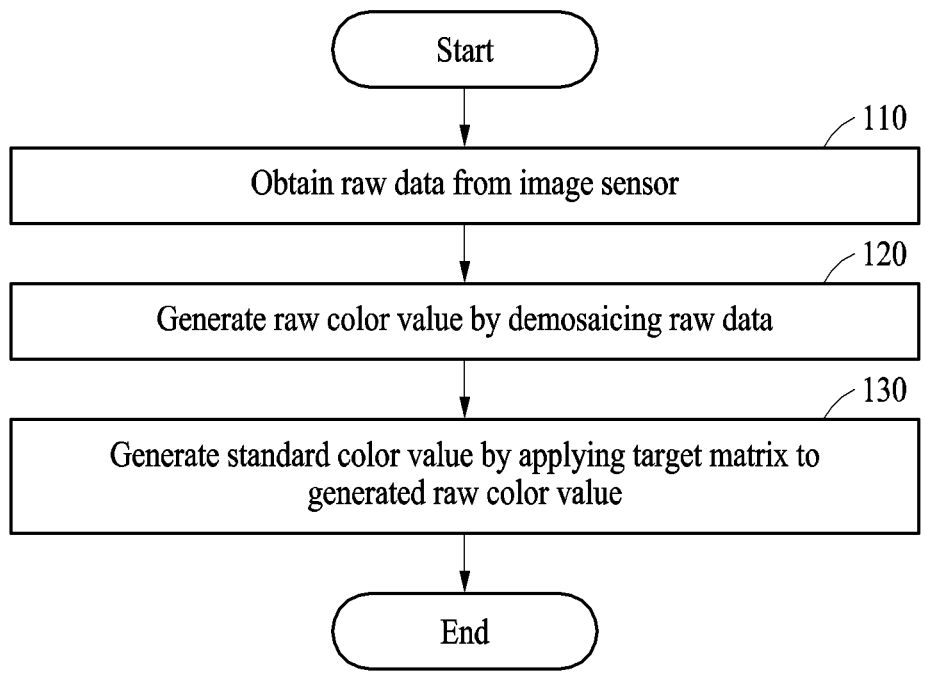
FIG. 1 illustrates an example of converting a raw color of raw data obtained from an image sensor to a standard color by an electronic device, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein may have same meanings as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application may be omitted when such description could cause an ambiguous interpretation of the example embodiments. Hereinafter, examples will be described in detail with reference to the accompanying drawings, and like reference numerals in the drawings refer to like elements throughout.

FIG. 1 illustrates an example of converting a raw color of raw data obtained from an image sensor to a standard color by an electronic device, according to one or more embodiments.

The electronic device may include an image sensor including a color filter having a plurality of color channels, a memory, including one or more memories configured to store a plurality of color conversion matrices, and a processor configured to obtain noise information of a color image captured by the image sensor, select a target matrix from among the color conversion matrices stored in the memory based on the obtained noise information, and perform a color conversion on the color image by applying the selected target matrix to the color image. Herein, it is noted that use of the term "may" with respect to an example or embodiment, e.g., as to what an example or embodiment may include or implement, means that at least one example or embodiment exists in which such a feature is included or implemented while all examples and embodiments are not limited to these examples.

As another example, the image sensor may be separate from the electronic device, and the electronic device includes communication hardware to receive or obtain the color image. The electronic device or another electronic device may perform the color conversion or communicate with the image sensor and the image sensor may perform the color conversion. As another example, the image sensor may include a processor configured to select the target matrix and perform the color conversion.

The image sensor of the electronic device may include a color filter having four or more color channels, in a non-limiting example. The image sensor of the electronic device may include a color filter configured to distinguish and pass rays of light corresponding to four or more colors. A multi-spectral camera may be a camera including an image sensor including a color filter having more than three color channels (e.g., red, green, blue (RGB) color channels). A color filter spectrum of the multi-spectral camera may be configured by frequency bands of a visible light area that are evenly divided by a narrow bandwidth or that overlap with each other by a wide bandwidth. In an example, the color filter spectrum of the multi-spectral camera may be configured as a spectrum representing the reflectance of objects.

In operation 110, the electronic device may obtain raw data from the image sensor. The image sensor may generate the raw data by capturing a color image.

In operation 120, the electronic device may generate a raw color value of each of the pixels in the color image by demosaicing the raw data obtained from the image sensor. For example, when the electronic device includes an image sensor including a color filter of RGB color channels, the electronic device may generate a R value, a G value, and a B value of each of the pixels in the color image by such an example as demosaicing of the raw data obtained from the image sensor. In an example, when the electronic device includes an image sensor including a color filter of N color channels, the electronic device may generate a raw color value of each of the pixels in the color image for each of the N color channels by such demosaicing of the raw data obtained from the image sensor, as a non-limiting example.

In operation 130, the electronic device may generate a standard color value by applying a target matrix to the raw color value. For example, under the assumption that a raw color has three RGB color channels and a standard color has three RGB color channels, the electronic device may convert RGB data of the raw color into RGB data of the standard color according to Equation 1, for example.

$$\begin{bmatrix} R_s \\ G_s \\ B_s \end{bmatrix} = A \cdot \begin{bmatrix} R_i \\ G_i \\ B_i \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} R_i \\ G_i \\ B_i \end{bmatrix} \quad \text{Equation 1}$$

In Equation 1, A denotes a target matrix and aij denotes an element included in the target matrix. $R_i$, $G_i$, and $B_i$ denote raw color values respectively corresponding to the RGB color channels of a pixel, and Rs, Gs, and Bs denote standard color values respectively corresponding to the RGB color channels of the pixel.

Figure 2:
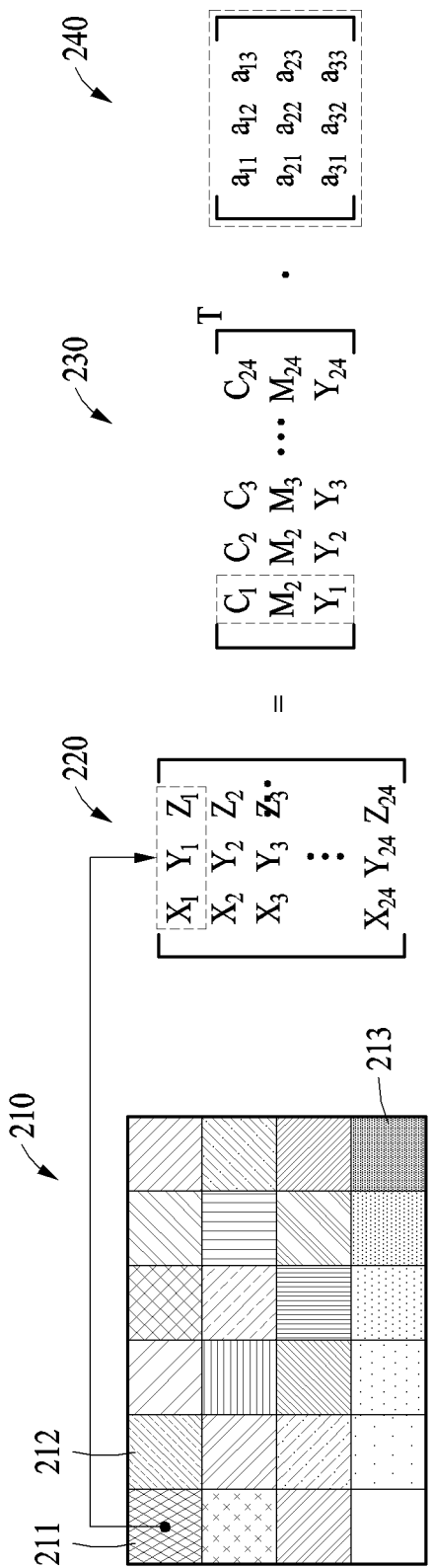
FIG. 2 illustrates an example of an operation, of an electronic device, generating a basic color conversion matrix, according to one or more embodiments.

FIG. 2 illustrates an example of an operation of an electronic device generating a basic color conversion matrix, according to one or more embodiments.

The electronic device may include a color filter, including a plurality of color channels. The electronic device may generate basic color conversion matrices using all the color channels included in the color filter.

In an example, an image sensor of the electronic device may capture a color chart 210 of which standard color values are preset for each of color patches 211, 212, . . . , 213. The electronic device may obtain raw data of the color chart 210 captured by the image sensor. The electronic device may generate a raw color value for each of the color channels of each of the pixels corresponding to the color chart 210 by demosaicing the raw data obtained from the image sensor. For example, the electronic device may generate a raw color value for each of the color channels of a pixel. The color chart 210 may be, for example, a Macbeth ColorChecker, but is not limited thereto.

The electronic device may select reference pixels from among the pixels corresponding to the color chart 210. The electronic device may model a basic color conversion matrix based on a first matrix including standard color values of the reference pixels and a second matrix including raw color values of the reference pixels. The second matrix may be a matrix including raw color values of the reference pixels corresponding to all the color channels included in the color filter.

The basic color conversion matrix may be a matrix converting the raw color values corresponding to all the color channels included in the color filter into the standard color values. For example, the electronic device may calculate the basic color conversion matrix that minimizes a difference between the first matrix and a matrix calculated by multiplying the second matrix by the basic color conversion matrix. In this example, the electronic device may convert the raw color values of the reference pixels based on element values of the matrix calculated by multiplying the second matrix by the basic color conversion matrix. The electronic device may calculate the basic color conversion matrix that minimizes a color conversion error between the converted color values of the reference pixels and the standard color values of the reference pixels, and store the basic color conversion matrix in the memory of the electronic device.

For example, referring to FIG. 2, under the assumption that a standard color uses a CIE XYZ color space and a raw color uses a CMY color space, the electronic device may generate and store a first matrix 220, including standard color values of reference pixels. In this example, XYZ data (e.g., $X_1$, $Y_1$, and $Z_1$) of the standard color value of a first reference pixel may constitute a first row of the first matrix 220. XYZ data (e.g., Xk, Yk, and Zk) of a standard color value of a kth reference pixel may constitute a kth row of the first matrix 220. Similarly, the electronic device may generate and store a second matrix 230, including raw color values of the reference pixels. The electronic device may calculate converted color values of the reference pixels based on the element values of a matrix calculated by multiplying the second matrix 230 by a basic color conversion matrix 240 and calculate the basic color conversion matrix 240 that minimizes a color conversion error between the converted color values of the reference pixels and the standard color values of the reference pixels. The electronic device may calculate the basic color conversion matrix 240 according to Equation 2, for example.

$$\tilde{A} = \arg\min_{A}\|Y - XA\|^2 = (X^TX)^{-1}X^TY \qquad \text{Equation 2}$$

In Equation 2, X denotes the first matrix 220, Y denotes the second matrix 230, and A denotes the basic color conversion matrix 240. In a non-limiting example, when the image sensor includes a color filter of four color channels, a basic color conversion matrix may have a size of 4×3 because the number of color channels constituting a raw color is four. In another non-limiting example, when the image sensor includes a color filter of five color channels, the basic color conversion matrix may have a size of 5×3. In addition, when the image sensor includes a color filter of M color channels, the basic color conversion matrix may have a size of M×3. In the foregoing examples, M may be a natural number greater than or equal to 3.

Figure 3:
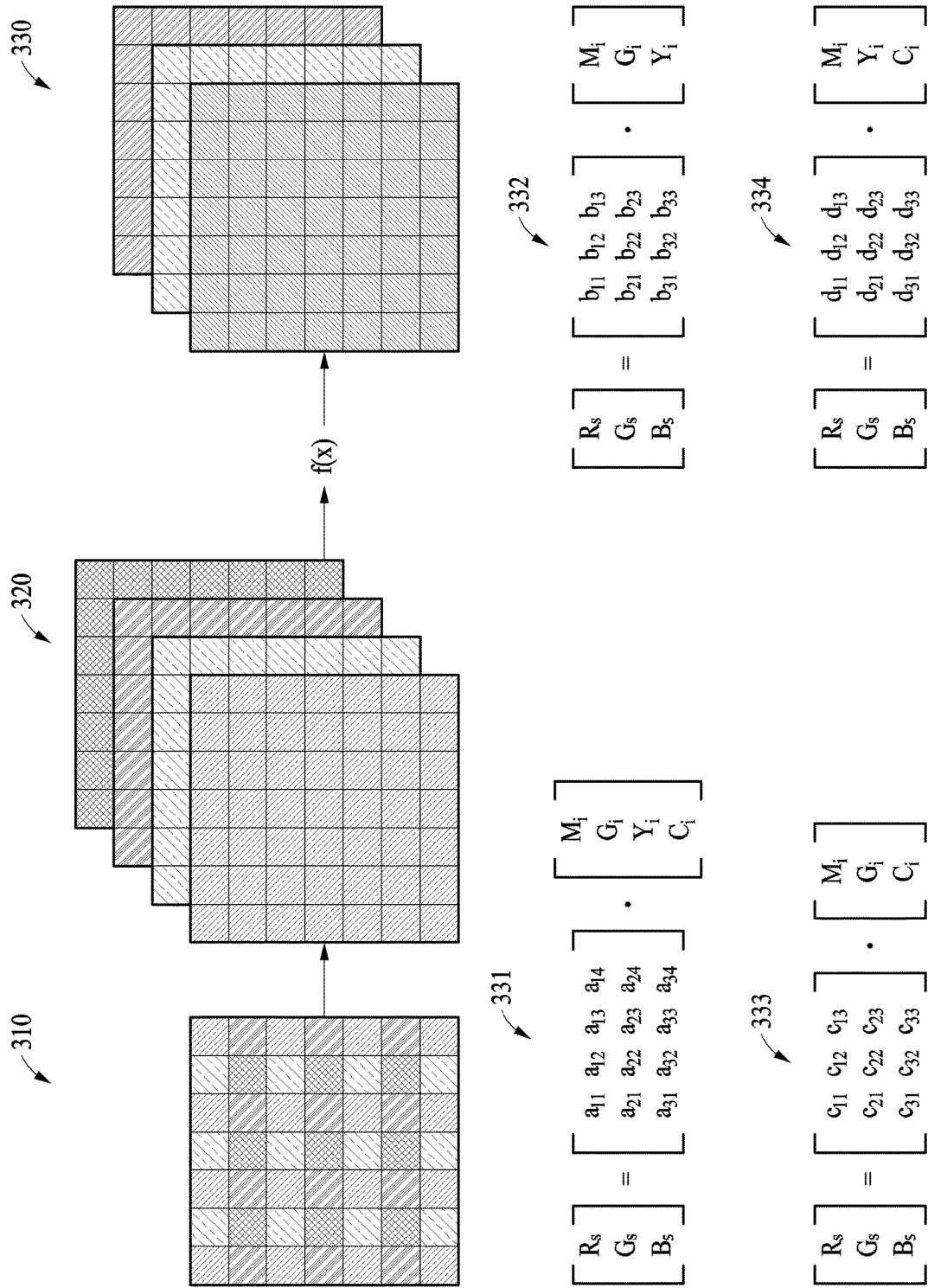
FIG. 3 illustrates an example of candidate color conversion matrices generated from a plurality of color channels of a color filter included in an image sensor of an electronic device, according to one or more embodiments.

FIG. 3 illustrates an example of candidate color conversion matrices generated from a plurality of color channels of a color filter included in an image sensor of an electronic device, according to one or more embodiments.

The electronic device may include an image sensor including a color filter having a plurality of color channels. The electronic device may generate candidate color conversion matrices using the color channels included in the color filter. The electronic device may select a plurality of color channels from among all the color channels included in the color filter. The electronic device may generate a candidate color conversion matrix with a combination of the selected color channels.

In an example, the electronic device may include an image sensor including a color filter having four or more color channels and may generate a candidate color conversion matrix from a color channel combination generated by selecting three or more color channels from among the four or more color channels.

In an example, the electronic device may model a candidate color conversion matrix corresponding to one color channel combination based on a first matrix (e.g., the first matrix 220 of FIG. 2) including standard color values of reference pixels and a third matrix including raw color values of the reference pixels corresponding to a plurality of color channels included in the color channel combination. For example, the electronic device may calculate a candidate color conversion matrix that minimizes a difference between the first matrix and a matrix calculated by multiplying the third matrix by the candidate color conversion matrix. The electronic device may calculate converted color values of the reference pixels based on element values of the matrix calculated by multiplying the third matrix by the candidate color conversion matrix and may calculate the candidate color conversion matrix that minimizes a color conversion error between the converted color values of the reference pixels and standard color values of the reference pixels.

A combination of color channels selected from among all the color channels included in the color filter may vary, and the electronic device may generate a candidate color conversion matrix corresponding to each color channel combination. For example, the electronic device may select all the color channels included in the color filter and may generate a basic color conversion matrix based on a candidate color conversion matrix corresponding to the combination of all the selected color channels.

For example, as shown in FIG. 3, an image sensor 310 of the electronic device may include a color filter of four color channels (e.g., MGYC channels), and a standard color may have three color channels (e.g., RGB channels). In operation 320, the electronic device may generate a raw color value of each reference pixel for each of the MGYC color channels by demosaicing raw data obtained from the image sensor 310. In operation 330, the electronic device may load a standard color value of each reference pixel for each of the RGB color channels. The electronic device may generate a plurality of candidate color conversion matrices 331, 332, 333, and 334 from the color channels included in the color filter. The electronic device may generate a candidate color conversion matrix from a color channel combination generated by selecting a plurality of color channels from among the color channels included in the color filter. For example, the electronic device may select all the color channels from among the MGYC color channels included in the color filter and may generate a basic color conversion matrix 331 as a candidate color conversion matrix from a color channel combination of the selected MGYC color channels. For another example, the electronic device may select MGY color channels from among the MGYC color channels included in the color filter and may generate a candidate color conversion matrix 332 from a color channel combination of the selected MGY color channels. In this example, the electronic device may model the candidate color conversion matrix 332 based on a matrix including standard color values of reference pixels and a matrix including raw color values of the reference pixels corresponding to the MGY color channels. The electronic device may select MGC color channels from among the MGYC color channels included in the color filter and may generate a candidate color conversion matrix 333 from a color channel combination of the selected MGC color channels. The electronic device may select GYC color channels from among the MGYC color channels included in the color filter and may generate a candidate color conversion matrix 334 from a color channel combination of the selected GYC color channels.

In an example, the electronic device may calculate a color conversion color difference and a noise amplification degree for each of candidate color conversion matrices generated from a plurality of color channels.

Hereinafter, calculating a color conversion color difference for a candidate color conversion matrix by the electronic device will be further described. In an example, the electronic device may calculate converted color values of reference pixels by applying a candidate color conversion matrix to raw color values of the reference pixels and may calculate a color conversion color difference of the candidate color conversion matrix based on a difference between the converted color values calculated for the reference pixels and standard color values of the reference pixels. The electronic device may calculate the converted color values of the reference pixels based on element values calculated by multiplying the raw color values of the reference pixels for color channels corresponding to the candidate color conversion matrix by the candidate color conversion matrix. In this example, the color channels corresponding to the candidate color conversion matrix may represent color channels included in a color channel combination corresponding to the candidate color conversion matrix. The electronic device may calculate a color conversion color difference for each of the candidate color conversion matrices and may select a first color conversion matrix that has a minimum color difference from among the candidate color conversion matrices.

Hereinafter, calculating a noise amplification degree a raw color conversion matrix by the electronic device will be further described. In an example, the electronic device may extract a diagonal matrix corresponding to a color conversion matrix through singular value decomposition (SVD) on a candidate color conversion matrix. The electronic device may calculate a noise amplification degree of the color conversion matrix based on singular values in the extracted diagonal matrix. The SVD, a technique of decomposing a matrix into one in a specific structure, may decompose a matrix into a multiplication of a left singular vector, a diagonal matrix, and a right singular vector. The left singular vector (U) and the right singular vector (V) may be orthogonal vectors corresponding to a rotation matrix that does not affect the size. The diagonal matrix ($\Sigma$) may be a scaling matrix.

For example, when a color conversion matrix has a size of 3×3, the SVD may be applied to the color conversion matrix as represented by Equation 3.

$$A = U\sum V = \begin{bmatrix} u_{11} & u_{12} & u_{13} \\ u_{21} & u_{22} & u_{23} \\ u_{31} & u_{32} & u_{33} \end{bmatrix} \cdot \begin{bmatrix} \sigma_1 & 0 & 0 \\ 0 & \sigma_2 & 0 \\ 0 & 0 & \sigma_3 \end{bmatrix} \cdot \begin{bmatrix} v_{11} & v_{12} & v_1 \\ v_{21} & v_{22} & v_{23} \\ v_{31} & v_{32} & v_{33} \end{bmatrix} \quad \text{Equation 3}$$

In Equation 3, A denotes a color conversion matrix, U denotes a left singular vector, $\Sigma$ denotes a diagonal matrix including singular values, and V denotes a right singular vector. $u_{ij}$ denotes an element value of the left singular vector U, $\sigma_i$ denotes an element value of the diagonal matrix, and $v_{ij}$ denotes an element value of the right singular vector V.

In an example, the electronic device may extract a diagonal matrix corresponding to a candidate color conversion matrix through the SVD performed on the candidate color conversion matrix and may calculate a noise amplification degree of the candidate color conversion matrix using singular values in the extracted diagonal matrix. In an example, the electronic device may calculate the noise amplification degree of the candidate color conversion based on a ratio of a minimum singular value to a maximum singular value among the singular values in the diagonal matrix.

In an example, the electronic device may calculate a color conversion color difference and a noise amplification degree for each of the candidate color conversion matrices generated from a plurality of color channels included in a color filter. The electronic device may store a first color conversion matrix that has a minimum color conversion color difference among the candidate color conversion matrices and a second color conversion matrix that has a minimum noise amplification degree.

Figure 4:
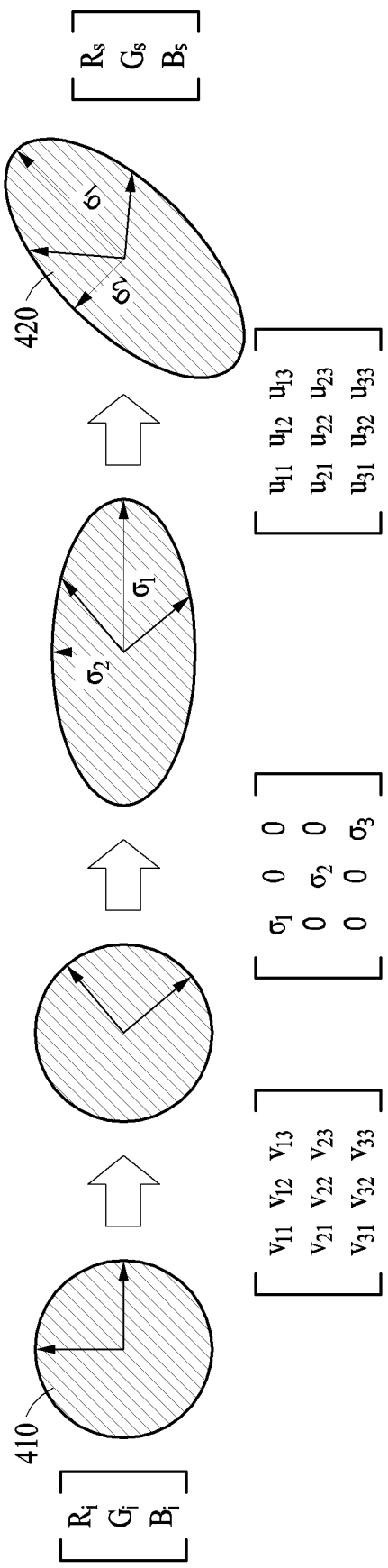
FIG. 4 illustrates an example of a process in which noise in a color image changes when an electronic device performs a color conversion, according to one or more embodiments.

FIG. 4 illustrates an example of a process in which noise in a color image changes when an electronic device performs a color conversion, according to one or more embodiments.

A distribution 410 may represent a distribution of raw color values generated for pixels when the electronic device captures a patch with a constant standard color value. When the electronic device captures the patch with a constant standard color value, the same raw color value may be derived for the pixels. However, due to noise in the captured color image, there may be variations between the raw color values of the pixels.

A distribution 420 may represent a distribution of converted color values calculated for the pixels by applying a color conversion matrix A to each of the raw color values generated for the pixels. Referring to the distribution 420, when the color conversion matrix A is applied to the raw color values of the pixels and a color conversion is thereby performed, the variation between color values may increase in a certain direction. Therefore, the noise in the captured color image may have a noise variation increased after the color conversion is performed, and noise in the result image output after the color conversion is performed may thus be greater than the noise in the captured color image.

Figure 5:
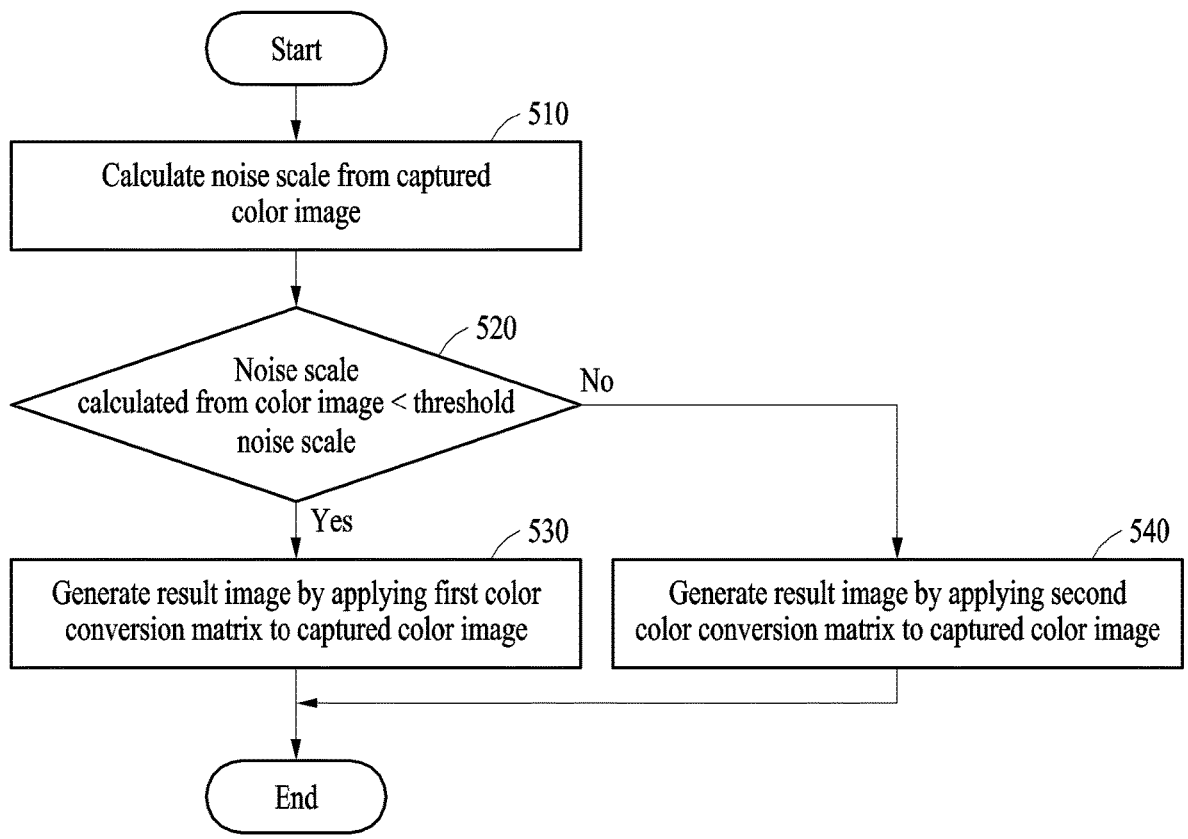
FIG. 5 illustrates an example of an operation, of an example electronic device, selecting a target matrix to be applied to a color image based on a noise scale in the color image, according to one or more embodiments.

FIG. 5 illustrates an example of an operation of an electronic device selecting a target matrix to be applied to a color image based on a noise scale in the color image, according to one or more embodiments.

Hereinafter, applying a target matrix to a color image may be construed as multiplying, by the target matrix, a matrix including raw color values of the color image.

In an example, the electronic device may obtain noise information in a color image captured by an image sensor and may select a target matrix to be applied to the color image based on the obtained noise information. In this example, the noise information in the color image may refer to noise information included in raw data of the color image. The noise information may be, for example, information including any one or any combination of any two or more of a noise scale in the color image, an exposure time corresponding to the color image, a f-number of a camera, an ISO value of the camera, and a white balance gain value applied to the color image.

In operation 510, the electronic device may calculate a noise scale of the color image captured by the image sensor. For example, in a case where an image of a region with a constant standard color value is captured, the electronic device may calculate the noise scale of the color image based on variations between raw color values generated for the pixels. In operation 520, the electronic device may determine whether the noise scale of the color image is less than a threshold noise scale. The threshold noise scale may vary for each electronic device and, in an example, may be preset by a manufacturer of the electronic device.

In operation 530, when the noise scale of the color image is less than the threshold noise scale, the electronic device may select, as a target matrix, a first color conversion matrix that has a minimum color conversion color difference from among candidate color conversion matrices. The electronic device may apply the first color conversion matrix selected as the target matrix to the color image. For example, the electronic device may perform a color conversion by multiplying a matrix including raw color values of pixels for color channels corresponding to the first color conversion matrix by the first color conversion matrix. In other words, the electronic device may calculate the converted color values of the pixels based on element values calculated by multiplying the matrix, including the raw color values of the pixels for the color channels corresponding to the first color conversion matrix by the first color conversion matrix and may generate a result image that has a standard color based on the calculated converted color values of the pixels. When less noise is in the color image, the amount of noise to be amplified as the color conversion is performed may also be small. Therefore, when the captured color image has less noise, the electronic device may apply the first color conversion matrix that minimizes a color difference to the color image, and thereby minimize the color difference without amplifying noise greatly.

In operation 540, when the noise scale of the color image is greater than or equal to the threshold noise scale, the electronic device may select, as the target matrix, a second color conversion matrix with a minimum noise amplification degree from among the candidate color conversion matrices. The electronic device may apply the second color conversion matrix selected as the target matrix to the color image. For example, the electronic device may perform a color conversion by multiplying a matrix including raw color values of pixels for color channels corresponding to the second color conversion matrix by the second color conversion matrix. In other words, the electronic device may calculate the converted color values of the pixels based on element values calculated by multiplying the matrix, including the raw color values of the pixels for the color channels corresponding to the second color conversion matrix by the second color conversion matrix and may generate a result image having a standard color based on the calculated converted color values of the pixels. When a lot of noise is in the captured color image, the amount of noise to be amplified as the color conversion is performed may also be relatively large. Therefore, when the captured color image has a lot of noise, the electronic device may apply the second color conversion matrix with a minimum noise amplification degree to the color image to not greatly amplify the noise. A signal-to-noise ratio (SNR) of a signal output through the color conversion may be degraded. Therefore, when the color image has a lot of noise, the electronic device may apply the second color conversion matrix that minimizes noise amplification to the color image.

Figure 6:
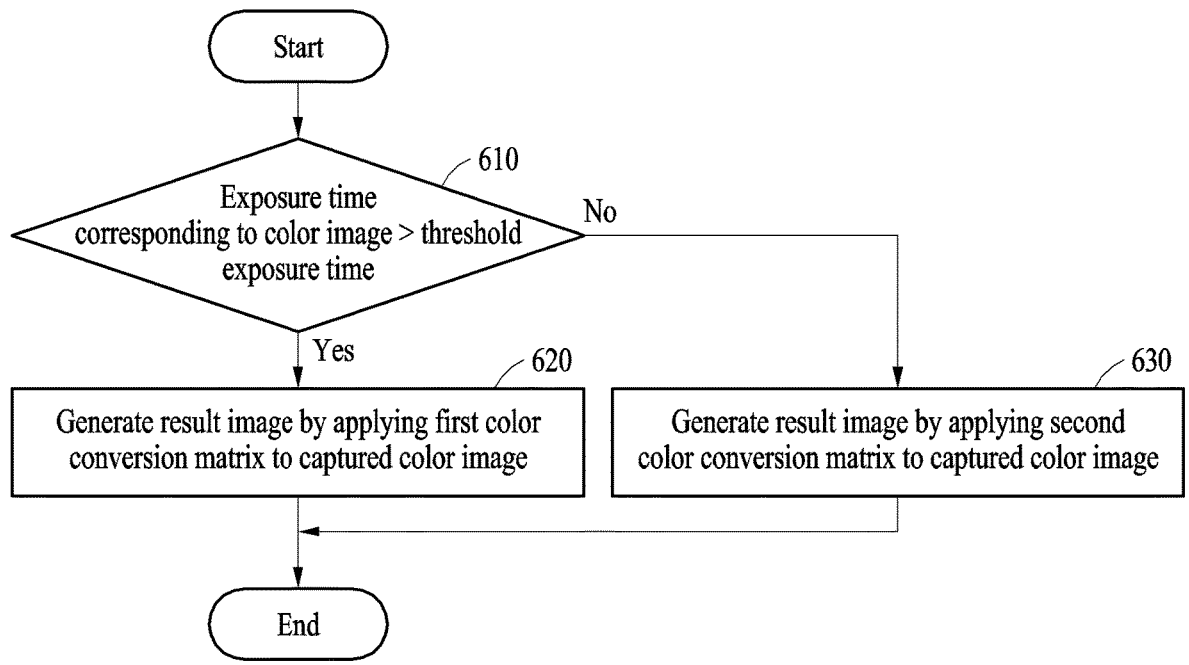
FIG. 6 illustrates an example of an operation, of an example electronic device, selecting a target matrix to be applied to a color image based on an exposure time corresponding to the color image, according to one or more embodiments.

FIG. 6 illustrates an example of an operation of an electronic device selecting a target matrix to be applied to a color image based on an exposure time corresponding to the color image, according to one or more embodiments.

In operation 610, the electronic device may determine whether an exposure time corresponding to a color image exceeds a threshold exposure time. The exposure time corresponding to the color image may be an exposure time of a camera for capturing the color image. The threshold exposure time may vary for each electronic device and, for example, may be preset by a manufacturer of the electronic device.

In operation 620, when the exposure time corresponding to the color image is greater than the threshold exposure time, the electronic device may select a first color conversion matrix that has a minimum color conversion color difference from among candidate color conversion matrices as a target matrix to be applied to the color image. The electronic device may apply the first color conversion matrix selected as the target matrix to the color image. When the exposure time corresponding to the color image is set to be great, an amount of light sufficient to be accumulated may be secured, and noise in the color image may thus be small. Therefore, the electronic device may apply the first color conversion matrix that minimizes a color difference, thereby minimizing the color difference without greatly amplifying noise.

In operation 630, when the exposure time corresponding to the color image is less than the threshold exposure time, the electronic device may select, as the target matrix, a second color conversion matrix that has a minimum noise amplification degree from among the candidate color conversion matrices. The electronic device may apply the second color conversion matrix selected as the target matrix to the color image. When the exposure time corresponding to the color image set to be small, an amount of light to be accumulated may be small and noise in the color image may thus be great. Therefore, the electronic device may apply the second color conversion matrix with the minimum noise amplification degree to the color image to not amplify noise greatly.

Figure 7:
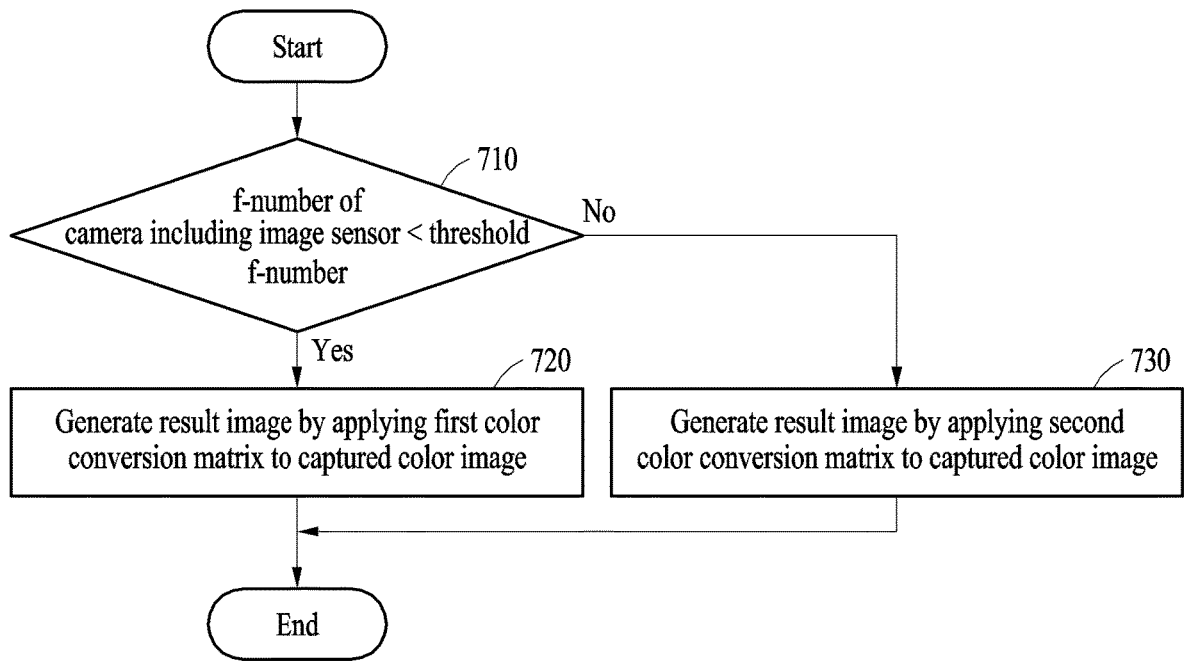
FIG. 7 illustrates an example of an operation, of an example electronic device, selecting a target matrix to be applied to a color image based on a f-number of a camera, according to one or more embodiments.

FIG. 7 illustrates an example of an operation of an electronic device selecting a target matrix to be applied to a color image based on a f-number of a camera, according to one or more embodiments.

In operation 710, the electronic device may determine whether a f-number of a camera having an image sensor is less than a threshold f-number. The threshold f-number may vary for each electronic device and may be preset by a manufacturer of the electronic device.

In operation 720, when the f-number of the camera having the image sensor is less than the threshold f-number, the electronic device may select a first color conversion matrix that has a minimum color conversion color difference from among candidate color conversion matrices as a target matrix to be applied to the color image. The electronic device may apply the first color conversion matrix selected as the target matrix to the color image. When the f-number of the camera is small, an aperture of a lens of the camera may be large and an amount of light sufficient to be accumulated may be secured, and noise in the color image may thus be small. Therefore, the electronic device may apply the first color conversion matrix that minimizes a color difference to the color image, thereby minimizing the color difference without greatly amplifying noise.

In operation 730, when the f-number of the camera having the image sensor is greater than or equal to the threshold f-number, the electronic device may select, as the target matrix, a second color conversion matrix that has a minimum noise amplification degree from among the candidate color conversion matrices. The electronic device may apply the second color conversion matrix selected as the target matrix to the color image. When the f-number of the camera is great, the aperture of the lens of the camera may be small and the amount of light to be accumulated may also be small, and there may thus be great noise in the color image. Therefore, the electronic device may apply the second color conversion matrix with the minimum noise amplification degree to the color image to not amplify noise greatly.

Figure 8:
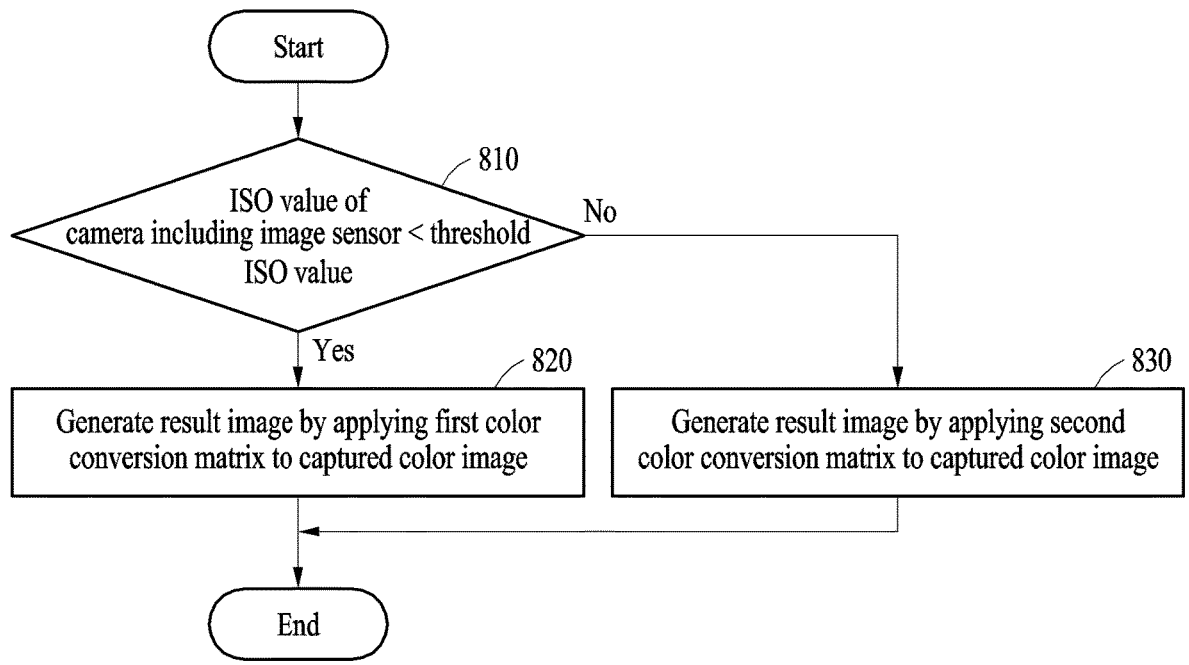
FIG. 8 illustrates an example of an operation, of an example electronic device, selecting a target matrix to be applied to a color image based on an ISO of a camera, according to one or more embodiments.

FIG. 8 illustrates an example of an operation of an electronic device selecting a target matrix to be applied to a color image based on an ISO of a camera, according to one or more embodiments.

In operation 810, the electronic device may determine whether an ISO value of a camera having an image sensor is less than a threshold ISO value. The threshold ISO value may vary for each electronic device and may be preset by a manufacturer of the electronic device.

In operation 820, when the ISO value of the camera having the image sensor is less than the threshold ISO value, the electronic device may select a first color conversion matrix that has a minimum color conversion color difference from among candidate color conversion matrices as a target matrix to be applied to the color image. The electronic device may apply the first color conversion matrix selected as the target matrix to the color image. When the ISO value of the camera is small, noise in the color image may be small; thus, applying the first color conversion matrix to the color image may minimize a color difference without greatly amplifying noise.

In operation 830, when the ISO value of the camera having the image sensor is greater than or equal to the threshold ISO value, the electronic device may select, as the target matrix, a second color conversion matrix that has a minimum noise amplification degree from among the candidate color conversion matrices. The electronic device may apply the second color conversion matrix selected as the target matrix to the color image. When an ISO value of the camera is great, noise in a color image may be great, and therefore, the second color conversion matrix may be applied in order not to amplify noise greatly.

Figure 9:
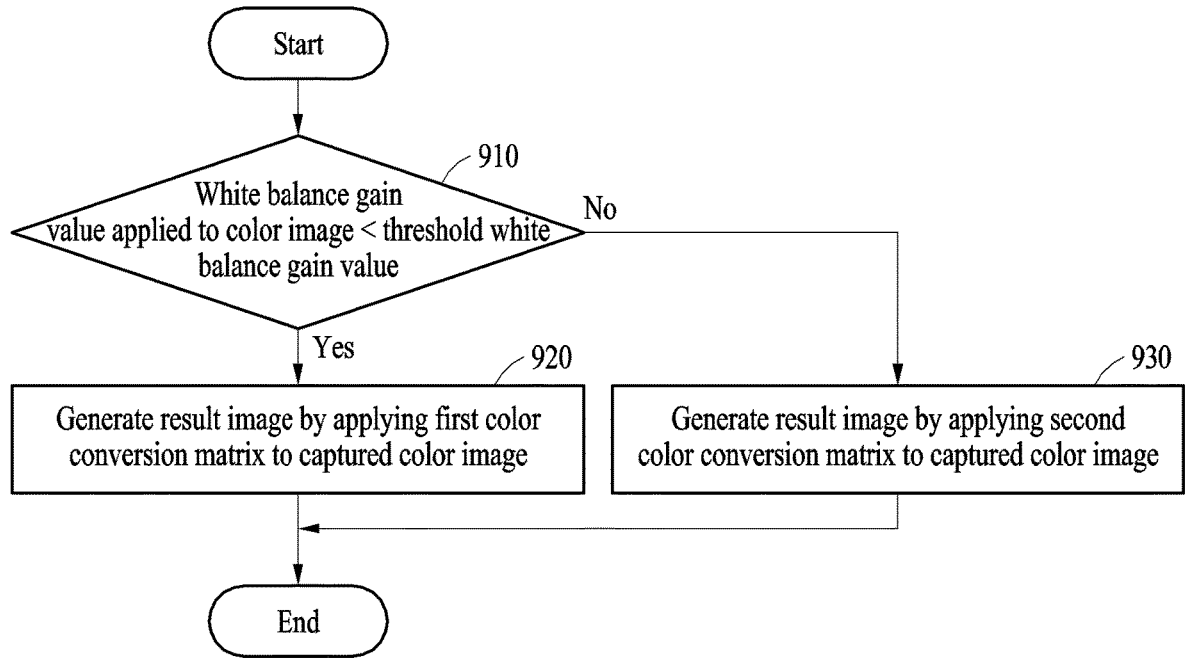
FIG. 9 illustrates an example of an operation, of an example electronic device, selecting a target matrix to be applied to a color image based on a white balance gain value applied to the color image, according to one or more embodiments.

FIG. 9 illustrates an example of an operation of an electronic device selecting a target matrix to be applied to a color image based on a white balance gain value applied to the color image, according to one or more embodiments.

In operation 910, the electronic device may determine whether a white balance gain value applied to the color image is less than a threshold white balance gain value. The threshold white balance gain value may vary for each electronic device and may be preset by a manufacturer of the electronic device.

In operation 920, the electronic device may select a first color conversion matrix that has a minimum color conversion color difference from among candidate color conversion matrices as a target matrix to be applied to the color image when the white balance gain value applied to the color image is less than the threshold white balance gain value. The electronic device may apply the first color conversion matrix selected as the target matrix to the color image. When the white balance gain value to be applied to the color image is small, noise in the color image may also be small, and therefore, the first color conversion matrix that minimizes a color difference may be applied to the color image in order not to amplify noise greatly while minimizing the color difference.

In operation 930, the electronic device may select a second color conversion matrix that has a minimum noise amplification degree from among candidate color conversion matrices as a target matrix when the white balance gain value applied to the color image is greater than or equal to the threshold white balance gain value. The electronic device may apply the selected second color conversion matrix to the color image. When the white balance gain value to be applied to the color image is great, noise in the color image may also be great, and therefore, the second color conversion matrix that has the minimum noise amplification degree may be applied to the color image in order not to amplify noise greatly.

In an example, the electronic device may select, as a target matrix, one from a first color conversion matrix and a second color conversion matrix, based on a plurality of elements among a noise scale of a color image, an exposure time corresponding to the color image, an f-number of a camera, an ISO value of the camera, and a white balance gain value applied to the color image, and apply the selected target matrix to the color image. For example, the electronic device may select, as the target matrix, one from the first color conversion matrix and the second color conversion matrix based on both the exposure time corresponding to the color image and the f-number of the camera having an image sensor and may apply the selected target matrix to the color image.

Figure 10A:
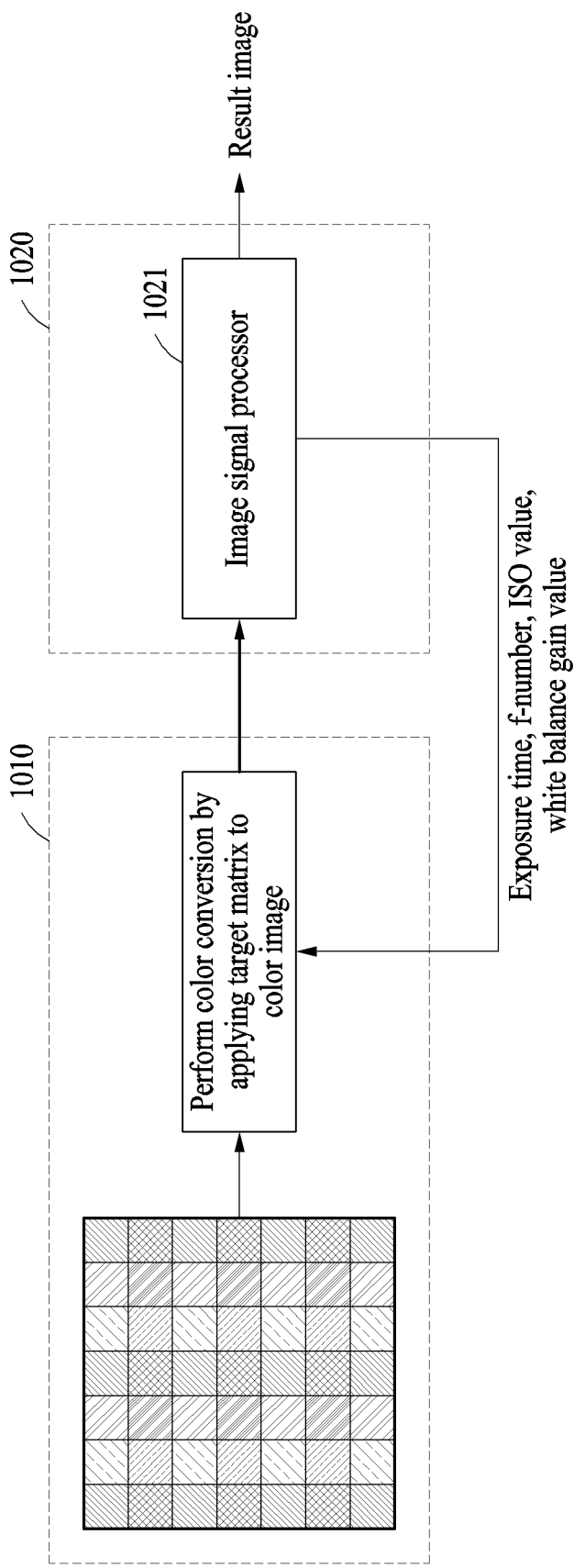
FIG. 10A illustrates an example of a color conversion performed in an image sensor, according to one or more embodiments.

FIG. 10A illustrates an example of a color conversion performed in an image sensor, according to one or more embodiments.

The electronic device may include an image sensor 1010 and an application processor 1020. The application processor 1020 may include an image signal processor 1021. Referring to FIG. 10A, a color conversion into a standard color for the color image may be performed in the image sensor 1010. The image signal processor 1021 may transmit, to the image sensor 1010, noise information, including any one or any combination of any two or more of a noise scale of the color image, an exposure time, an f-number of a camera, an ISO value of the camera, and a white balance gain value applied to the color image, and the image sensor 1010 may select a target matrix to be applied to the color image based on the noise information obtained from the image signal processor 1021. The image sensor 1010 may perform the color conversion into the standard color by applying the selected target matrix to the color image. When the color conversion is performed in the image sensor 1010, the image signal processor 1021 may be used without a great change.

Figure 10B:
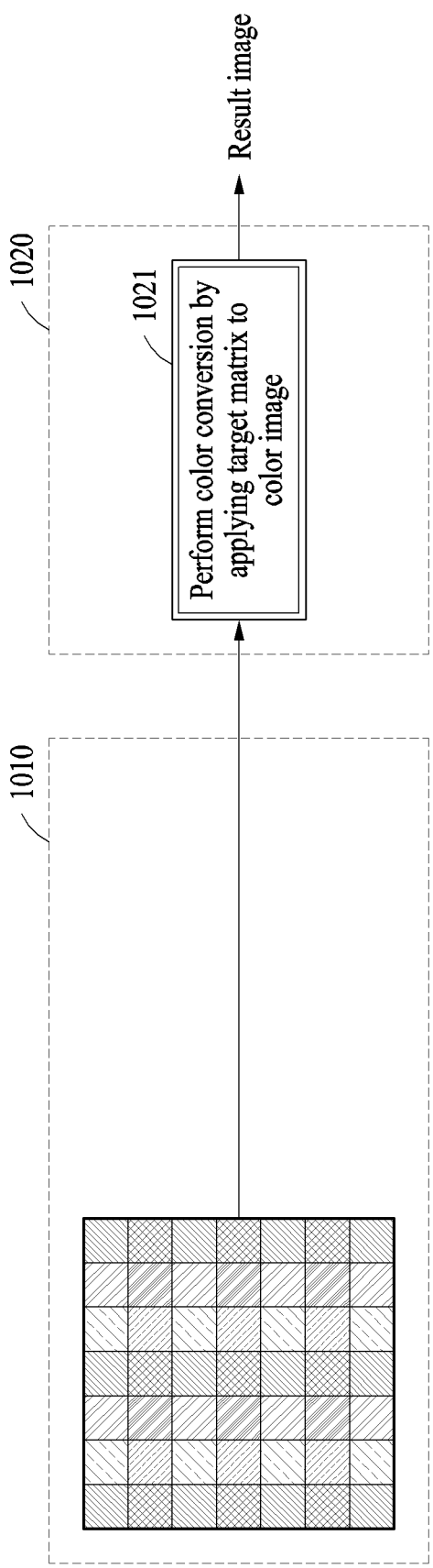
FIG. 10B illustrates an example of a color conversion performed in an image signal processor, according to one or more embodiments.
Figure 10C:
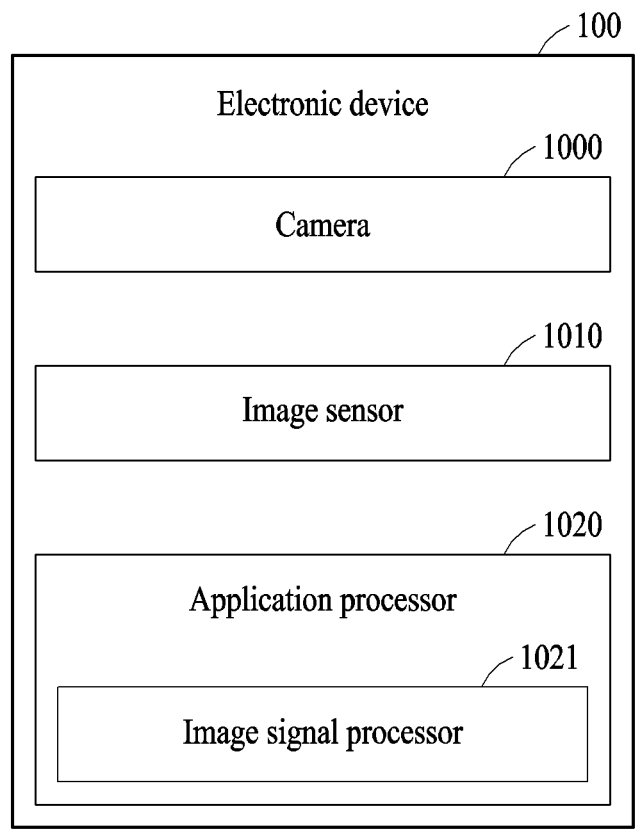
FIG. 10C illustrates an example of an electronic device including a processor, according to one or more embodiments.

FIG. 10B illustrates an example of a color conversion performed in an image signal processor, according to one or more embodiments.

In an example, the image signal processor 1021 may perform a color conversion on a color image. For example, the image signal processor 1021 may obtain raw color values of pixels corresponding to the color image captured by the image sensor 1010. The image signal processor 1021 may select a target matrix to be applied to the color image based on noise information, including any one or any combination of any two or more of a noise scale of the captured color image, an exposure time, an f-number of a camera, an ISO value of the camera, and a white balance gain value applied to the color image. The image signal processor 1021 may perform the color conversion into a standard color by applying the selected target matrix to the color image.

FIG. 10O illustrates, as an example, an electronic device 100, including a camera 1000, an image sensor 1010, an application processor 1020, and an image signal processor 1021, according to one or more embodiments.

As a non-exhaustive example only, the electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The electronic device, electronic device 100, camera 1000, image sensor 1010, application processor 1020, image signal processor 1021, and other apparatuses, devices, units, modules, and components described herein are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10C that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
an image sensor comprising a color filter having a plurality of color channels;
a memory storing a plurality of color conversion matrices and instructions; and
a processor configured to:
obtain noise information of a color image captured by the image sensor;
select a target matrix from among the plurality of the color conversion matrices based on whether the obtained noise information meets a threshold; and
generate a color converted image by applying the selected target matrix to the color image,
wherein the noise information comprises any one or any combination of any two or more of a noise scale representing variation between raw color values of pixels in the color image, an exposure time corresponding to the color image, a focal number (f-number) of a camera including the image sensor, an International Organization for Standardization (ISO) value of the camera, and a white balance gain value applied to the color data used to generate the color image.

2. The electronic device of claim 1, wherein a total number of the plurality of the color channels is four or more.

3. The electronic device of claim 1, wherein the memory
stores a first color conversion matrix, as a color conversion matrix of at least one of plural candidate color conversion matrices, having a minimum color conversion color difference, and
stores a second color conversion matrix, as another color conversion matrix among the plural candidate color conversion matrices, having a minimum noise amplification factor.

4. The electronic device of claim 3, wherein, for the generation of the color converted image, the processor is further configured to:
in response to the noise scale of the color image being determined to be less than a threshold noise scale, apply the first color conversion matrix to the color image to generate the color converted image; and
in response to the noise scale of the color image being determined to be greater than or equal to the threshold noise scale, apply the second color conversion matrix to the color image to generate the color converted image.

5. The electronic device of claim 3, wherein, for the generation of the color converted image, the processor is further configured to:
in response to the exposure time corresponding to the color image being determined to be greater than a threshold exposure time, apply the first color conversion matrix to the color image to generate the color converted image; and
in response to the exposure time corresponding to the color image being determined to be less than or equal to the threshold exposure time, apply the second color conversion matrix to the color image to generate the color converted image.

6. The electronic device of claim 3, wherein, for the generation of the color converted image, the processor is further configured to:|
in response to the focal number (f-number) of the camera comprising the image sensor being less than a threshold f-number, apply the first color conversion matrix to the color image to generate the color converted image; and
in response to the f-number of the camera being greater than or equal to the threshold f-number, apply the second color conversion matrix to the color image to generate the color converted image.

7. The electronic device of claim 3, wherein, for the generation of the color converted image, the processor is further configured to:
in response to the International Organization for Standardization (ISO) value of the camera comprising the image sensor being less than a threshold ISO value, apply the first color conversion matrix to the color image to generate the color converted image; and
in response to the ISO value of the camera being greater than or equal to the threshold ISO value, apply the second color conversion matrix to the color image to generate the color converted image.

8. The electronic device of claim 3, wherein, for the generation of the color converted image, the processor is further configured to:
in response to the white balance gain value applied to the color image being less than a threshold white balance gain value, apply the first color conversion matrix to the color image to generate the color converted image; and
in response to the white balance gain value applied to the color image being greater than and equal to the threshold white balance gain value, apply the second color conversion matrix to the color image to generate the color converted image.

9. The electronic device of claim 3, wherein the processor is further configured to:
select one or more color channel combinations by selecting respective portions of color channels from the plurality of color channels;
generate a candidate color conversion matrix for each of the color channel combinations; and
model one candidate color conversion matrix, of the plural candidate color conversion matrices, corresponding to one of the color channel combinations, to minimize a difference between a matrix calculated by multiplying a matrix comprising raw color values of reference pixels corresponding to color channels comprised in the one of the color channel combinations by a candidate color conversion matrix corresponding to the one of the color channel combinations and a matrix comprising standard color values of the reference pixels.

10. The electronic device of claim 1, wherein the processor is further configured to:
calculate respective color conversion color differences and noise amplification factors for plural candidate color conversion matrices of the plurality of color conversion matrices generated from at least plural color channels among the plurality of the color channels.

11. The electronic device of claim 10, wherein the processor is further configured to:
generate raw color values of reference pixels by demosaicing raw data obtained from the image sensor,
calculate converted color values of the reference pixels by applying a candidate color conversion matrix, among the plurality of candidate color conversion matrices, to the raw color values of the reference pixels; and
calculate a color conversion color difference of the candidate color conversion matrix based on a difference between the converted color values calculated for the reference pixels and standard color values of the reference pixels.

12. The electronic device of claim 10, wherein the processor is further configured to:
    perform a singular value decomposition (SVD) on each of at least the plural candidate color conversion matrices, among the plural candidate color conversion matrices, and respectively extract a diagonal matrix of the plural candidate color conversion matrices; and
    calculate respective noise amplification factors of the at least plural candidate color conversion matrices based on corresponding singular values in the respective extracted diagonal matrices of the at least plural candidate color conversion.

13. The electronic device of claim 12, wherein, for the calculating of the respective noise amplification factors, the processor is further configured to:
    calculate a noise amplification factor, among the respective noise amplification factors, based on a ratio of a minimum element value to a maximum element value among element values comprised in a corresponding extracted diagonal matrix among the respectively extracted diagonal matrices, and store the noise amplification factor in the memory.

14. A processing-implemented method performed by the electronic device, the method comprising:
    generating noise information, by a processor component of the electronic device, of a color image captured by an image sensor, as another component of the electronic device, comprising a color filter comprising a plurality of color channels; and
    selecting a target matrix from among a plurality of color conversion matrices based on whether the obtained noise information meets a threshold, and performing a color conversion of the color image by applying the selected target matrix to the color image,
    wherein the noise information comprises any one or any combination of any two or more of a noise scale representing variation between raw color values of pixels in the color image, an exposure time corresponding to the color image, a focal number (f-number) of a camera including the image sensor, an International Organization for Standardization (ISO) value of the camera, and a white balance gain value applied to the color data used to generate the color image.

15. The method of claim 14, wherein the generating of the noise information comprises:
    generating the noise information of the color image captured by the image sensor dependent on the color filter comprising four or more color channels.

16. The method of claim 14, further comprising:
    storing a first color conversion matrix, as a color conversion matrix of at least one of plural candidate color conversion matrices, having a minimum color conversion color difference; and
    storing a second color conversion matrix, as another color conversion matrix among the plural candidate color conversion matrices, having a minimum noise amplification factor.

17. The method of claim 16, wherein the performing of the color conversion comprises:
    in response to the noise scale of the color image being less than a threshold noise scale, applying the first color conversion matrix to the color image; and
    in response to the noise scale of the color image being greater than or equal to the threshold noise scale, applying the second color conversion matrix to the color image.

18. The method of claim 16, wherein the performing of the color conversion comprises:
    in response to the exposure time corresponding to the color image being greater than a threshold exposure time, applying the first color conversion matrix to the color image; and
    in response to the exposure time corresponding to the color image being less than or equal to the threshold exposure time, applying the second color conversion matrix to the color image.

19. The method of claim 16, wherein the performing of the color conversion comprises:
    in response to the focal number (f-number) of the camera comprising the image sensor being less than a threshold f-number, applying the first color conversion matrix to the color image; and
    in response to the f-number of the camera being greater than or equal to the threshold f-number, applying the second color conversion matrix to the color image.

20. The method of claim 16, wherein the performing the color conversion comprises:
    applying the first color conversion matrix to the color image in response to the International Organization for Standardization (ISO) value of the camera comprising the image sensor being less than a threshold ISO value; and
    applying the second color conversion matrix to the color image in response to the ISO value of the camera being greater than or equal to the threshold ISO value.

21. The method of claim 16, wherein the performing of the color conversion comprises:
    in response to the white balance gain value applied to the color image being less than a threshold white balance gain value, applying the first color conversion matrix to the image; and
    in response to the white balance gain value applied to the color image being greater than and equal to the threshold white balance gain value, applying the second color conversion matrix to the image.

22. The method of claim 14, wherein the plurality of color conversion matrices are stored in a memory of the electronic device.

23. A non-transitory computer-readable storage medium storing instructions that, when executed by a processor, configure the processor to perform the method of claim 14.

24. An electronic device comprising:
    an image sensor comprising a color filter having a plurality of color channels; and
    a processor configured to:
        obtain noise information of a color image captured by the image sensor;
        differently select a target matrix, from among a plurality of color conversion matrices, dependent on whether the obtained noise information meets a threshold to generate a color converted image; and
        generate the color converted image by applying the selected target matrix to the color image,
    wherein the noise information comprises any one or any combination of any two or more of a noise scale representing variation between raw color values of pixels in the color image, an exposure time corresponding to the color image, a focal number (f-number) of a camera including the image sensor, an International Organization for Standardization (ISO) value of the camera, and a white balance gain value applied to the color data used to generate the color image.

25. The electronic device of claim 24, further comprising:
memories configured to store the plurality of color conversion matrices and instructions,
wherein the processor is further configured to execute the instructions to configure the processor to obtain the noise information of the color image captured by the image sensor or the camera including the image sensor.

\* \* \* \* \*